(12) United States Patent
Varshney et al.

(10) Patent No.: US 7,674,285 B2
(45) Date of Patent: Mar. 9, 2010

(54) POLYANHYDRIDE POLYMERS AND THEIR USES IN BIOMEDICAL DEVICES

(75) Inventors: Sunil K. Varshney, Montreal (CA); Olexander Hnojewyi, Emerald Hills, CA (US); Jianxin Zhang, Dorval (CA); Patrick Rivelli, Palo Alto, CA (US)

(73) Assignee: Bioabsorbable Therapeutics, Inc., Menlo Park, CA (US)

( * ) Notice: Subject to any disclaimer, the term of this patent is extended or adjusted under 35 U.S.C. 154(b) by 0 days.

(21) Appl. No.: 12/484,102

(22) Filed: Jun. 12, 2009

(65) Prior Publication Data
US 2009/0253806 A1 Oct. 8, 2009

Related U.S. Application Data

(63) Continuation of application No. 11/389,434, filed on Mar. 23, 2006, now abandoned.

(51) Int. Cl.
*A61F 2/06* (2006.01)
(52) U.S. Cl. ............ 623/1.42; 623/1.1; 623/1.38; 623/1.44; 623/1.46; 623/1.49; 528/271; 424/426
(58) Field of Classification Search ............ 528/176, 528/271, 296, 297, 302, 350, 341, 272; 525/122, 525/285, 301, 320; 424/426, 428; 623/1.38, 623/1.42, 1.44, 1.46, 1.49
See application file for complete search history.

(56) References Cited

U.S. PATENT DOCUMENTS

| 4,757,128 A | 7/1988 | Domb et al. |
| 4,857,311 A | 8/1989 | Domb et al. |
| 4,886,870 A | 12/1989 | D'Amore et al. |
| 4,888,176 A | 12/1989 | Langer et al. |
| 4,997,904 A | 3/1991 | Domb |
| 5,264,540 A | 11/1993 | Cooper et al. |
| 5,270,419 A | 12/1993 | Domb |
| 5,543,158 A | 8/1996 | Gref et al. |
| 5,565,215 A | 10/1996 | Gref et al. |
| 5,756,652 A | 5/1998 | Storey et al. |
| 5,902,599 A | 5/1999 | Anseth et al. |
| 6,468,214 B2 | 10/2002 | Hsu et al. |

(Continued)

FOREIGN PATENT DOCUMENTS

EP 0 266 603 A1 5/1998

(Continued)

OTHER PUBLICATIONS

U.S. Appl. No. 12/446,498, filed Apr. 21, 2009, Hnojewyj et al.

(Continued)

*Primary Examiner*—Ling-Siu Choi
*Assistant Examiner*—Frances Tischler
(74) *Attorney, Agent, or Firm*—King & Spalding LLP

(57) ABSTRACT

A biocompatible, bioerodable polyanhydride polymer having a Young's modulus between about 1.5 and 3 and a selected rate of surface degradation, and methods of forming and using the polymer, are disclosed. The polymer is formed of a polyester prepolymer having a preferred molecular weight of greater than 5 and less than 7.5 Kdaltons, and a selected number of anhydride linkages between 5 and about 30.

7 Claims, 7 Drawing Sheets

U.S. PATENT DOCUMENTS

| | | |
|---|---|---|
| 6,468,519 B1 | 10/2002 | Uhrich |
| 6,486,214 B1 | 11/2002 | Uhrich |
| 6,613,807 B2 | 9/2003 | Uhrich |
| 6,685,928 B2 | 2/2004 | Uhrich et al. |
| 6,861,087 B2 | 3/2005 | Han et al. |
| 6,932,930 B2 | 8/2005 | DeSimone et al. |
| 6,997,948 B2 | 2/2006 | Stinson |
| 7,279,005 B2 | 10/2007 | Stinson |
| 2002/0082679 A1 | 6/2002 | Sirhan et al. |
| 2003/0035787 A1 | 2/2003 | Uhrich |
| 2003/0059469 A1 | 3/2003 | Uhrich |
| 2004/0015187 A1 | 1/2004 | Lendlein et al. |
| 2004/0043135 A1 | 3/2004 | Han et al. |
| 2004/0057970 A1 | 3/2004 | Domb |
| 2004/0171747 A1 | 9/2004 | Zhong |
| 2004/0176565 A1 | 9/2004 | Lee et al. |
| 2004/0181271 A1 | 9/2004 | DeSimone et al. |
| 2004/0197311 A1 | 10/2004 | Brekke et al. |
| 2005/0042293 A1 | 2/2005 | Jackson et al. |
| 2005/0053577 A1 | 3/2005 | Uhrich |
| 2005/0055078 A1 | 3/2005 | Campbell |
| 2005/0069573 A1 | 3/2005 | Cohn et al. |
| 2005/0089506 A1 | 4/2005 | Uhrich |
| 2005/0137678 A1 | 6/2005 | Varma |
| 2005/0169882 A1 | 8/2005 | Lowe et al. |
| 2005/0228492 A1 | 10/2005 | DeSimone et al. |
| 2006/0188546 A1 | 8/2006 | Giroux |
| 2007/0092704 A1 | 4/2007 | Patel et al. |
| 2007/0135834 A1 | 6/2007 | Clubb et al. |
| 2007/0179590 A1 | 8/2007 | Lu et al. |
| 2007/0225472 A1 | 9/2007 | Varshney et al. |
| 2007/0270941 A1 | 11/2007 | Headley et al. |
| 2008/0014170 A1 | 1/2008 | Hnojewyj et al. |

FOREIGN PATENT DOCUMENTS

| | | |
|---|---|---|
| WO | WO 97/31966 A1 | 9/1997 |
| WO | WO 03/000237 A2 | 1/2003 |
| WO | WO 2004/045549 A2 | 6/2004 |
| WO | WO 2005/042600 A2 | 5/2005 |
| WO | WO 2005/065581 A1 | 7/2005 |
| WO | WO 2007/111900 A2 | 10/2007 |

OTHER PUBLICATIONS

"Therapeutics Company Raises US$9M fro Biodegradable Polymer Stents.", May 10, 1997, *The Azo Journal of Materials Online*, -www.azom.com/news.asp?newsID=8492 (2007).

Bryers, J.D. et al., "Biodegradation of poly(anhydride-esters) into non-steroidal anti-inflammatory drugs and their effect on *Pseudomonas aeruginosa* biofilms in vitro and on the foreign-body response in vivo", *Biomaterials*, 27(29):5039-5048 (2006).

The International Search Report for PCT application PCT/US2007/007001, search report dated Sep. 14, 2007, 4 pages (2007).

PCT application PCT/US2009/000187, International Filing Date Jan. 12, 2009, 60 pages (2009).

Engelberg, I et al., "Physico-mechanical properties of degradable polymers used in medical applications: a comparative study", *Biomaterials*, 12(3):292-304 (1991).

Erdmann, L. and Uhrich, K.E., "Synthesis and degradation characteristics of salicylic acid-derived Poly(anhydride-esters)", *Biomaterials*, 21(19):1941-1946 (2000).

Erdmann, L. et al., "Degradable poly(anhydride ester) implants: effects of localized salicylic acid release on bone", *Biomaterials*, 21(24):2507-2512 (2000).

Jain, J.P. et al., "Role of polyanhydrides as localized drug carriers", *Journal of Controlled Release*, 103(3):541-563 (2005).

Korhonen, H. et al., "Synthesis of Poly(ester-Anhydrides) Based on Different Polester Precursors", *Macromol Chem. Phys.*, 205:937-945 (2004).

Kowalski, A. et. al., "Polymerization of L,L-Lactide Initiated by Aluminum Isopropoxide Trimer or Tetramer", *Macromolecules*, 31:2114-2122 (1998).

Prudenico, A. et al., "Effect of Linker Structure on Salicylic Acid-Derived Poly(anhydride-esters)", *Biomacromolecules*, 38(16):6895-6901 (2005).

Rosen, H.B. et al., "Bioerodible polyanhydrides for controlled drug delivery", *Biomaterials*, 4(2):131-133 (1983).

Schmeltzer, R.C. et al., "Synthesis and Cytotoxicity of Salicylate-based Poly(anhydride esters)", *Biomacromolecules*, 6(1):359-367 (2000).

Storey, R.F. and Taylor, A.E., "Synthesis of Novel Biodegradable Poly(ester-Anhydride)s", *J. Macromol Sci., Pure Appl. Chem.*, A34(2):265-280 (1997).

Whitaker-Brothers, K. and Uhrich, K.E., "Investigation into the Erosion Mechanism of Salicylate-based Poly(anhydride esters)", *Journal of Biomedical Materials Research*, 76(3):470-479 (2005).

Zhu et al, "Analysis of the accuracy of determining average molecular weights of narrow polydispersity polymers by matrix-assisted laser desorption ionization time-of-flight mass spectrometry", *Journal of the American Society for Mass Spectrometry*, 9(4):275-281(7) (1998).

POLYANHYDRIDE POLYMERS AND THEIR USES IN BIOMEDICAL DEVICES

This application is a continuation of U.S. patent application Ser. No. 11/389,434 filed Mar. 23, 2006, now abandoned, which is incorporated in its entirety herein by reference.

FIELD OF THE INVENTION

The present invention relates to improved biodegradable polyanhydride polymers, and to polyanhydride polymers having elasticity characteristics suitable for a variety of implantation uses, such as biodegradable stents.

BACKGROUND OF THE INVENTION

Biodegradable polymers are being used for many applications in medicine, including as a carrier for controlled release drug delivery systems, and in biodegradable bone pins, screws, and scaffolds for cells in tissue engineering. A principal advantage of the materials based on biodegradable polymers over existing non-biodegradable polymers or metal-based material is that the products are removed over time by bioerosion, avoiding the need for surgical removal.

Despite the growing need in medical applications, only few synthetic biodegradable polymers are currently used routinely in humans as carriers for drug delivery: ester copolymers of lactide, lactone and glycolide (PLA family) and anhydride copolymers of sebacic acid (SA) and 1,3-bis-carboxyphenoxy)propane (CPP). PLA is the most widely used due to its history of safe use as surgical sutures and in current drug delivery products like the Lupron Depot 19. While the development of PLA remains among the most important advances in medical biomaterials, there are some limitations that significantly curtail its use, in particular:

1. PLA polymers typically take a few weeks to several months to completely degrade in the body, but the device is typically depleted of drug more rapidly.

2. PLA devices undergo bulk erosion, which leads to a variety of undesirable outcomes, including exposure of unreleased drug to a highly acidic environment.

3. It is difficult to release drugs in a continuous manner from PLA particles owing to the polymers' bulk-erosion mechanism.

4. The particularly fine PLA particles needed for intravenous injection or inhalation can agglomerate significantly, making resuspension for injection or aerosolization for inhalation difficult.

Polyanhydrides, because of their more labile polymer bond, show a more rapid degradation rate and also tend to exhibit surface, rather than bulk degradation. Because of these advantages, polyanhydrides polymers may be preferred in biological applications where it is critical to achieve a high degradation rate and/or a better controlled rate of erosion from the polymer surface.

More recently, mixed polester/polyanhydride polymers that combine the release characteristics of both polyester and polyanhydride polymers have been proposed. See, for example, Storey, R. et al., *J. Macromol Sci., Pure Appl. Chem.*, A34(2) pp 265-280 (1997), U.S. Pat. No. 5,756,652, and Korhonen, H. et al., *Macromol Chem. Phys.*, 205, pp 937-945 (2004). These polymers may be thought of as containing a selected proportion of ester and anhydride linkages along the polymer backbone chains. Increasing the proportion of anhydride linkages in the mixed polymers leads to enhanced rate of surface erosion. In certain types of mixed polyester/polyanhydride polymers, at least, the rate of erosion was found to be biphasic, evidencing a relatively rapid release of polyester components and a slower breakdown of the released polyester moieties.

One limitation of polyanhydride polymers, however, is their relatively high stiffness, or Young's modulus of elasticity, typically in the range of 3-5 GPa, making these polymers unsuitable for applications in which polymer expansion or bending is required. One important area where an expandable polymer would be useful is intravascular stents, which are carried on balloon catheters and deployed at a site of vascular injury by radial expansion, requiring the ability to expand significantly, and once expanded to hold their shape within a vessel. These physical requirements have limited stent construction heretofore largely to metal-lattice construction.

It would thus be desirable to provide a biocompatible, biodegradable polymer having improved biodegradation and drug-release properties. It would also be desirable to provide a biocompatible, biodegradable stent having the requisite deformability and shape-retention, but also capable of biodegrading over a desired "stenting" period and exhibiting surface rather than bulk erosion.

SUMMARY OF THE INVENTION

The invention includes, in one aspect, polyanhydride polymer having the structure:

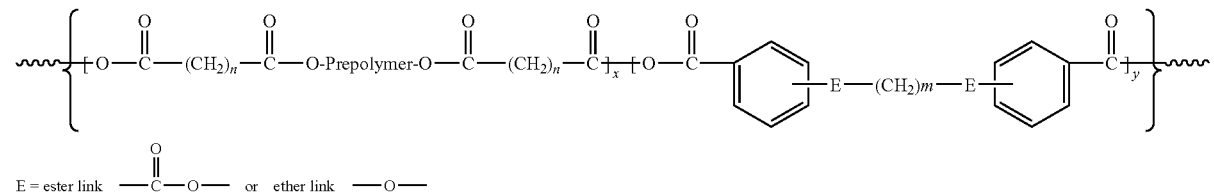

where E is a para ester linkage or an ortho or para ether linkage, the pre-polymer is an α-ω,-dihydroxy terminated polyester or polyether polymer having a molecular weight in a selected range between 1 to 10 Kdaltons; x=80% to 98% by weight, y=20% to 2% by weight, n=2 to 4, m=2 to 10; and the average total number of anhydride linkages is a selected number in the range between 5-30. The linked phenoxy structure in the polymer may be 1,3-bis(p-carboxyphenoxy)propane anhydride, present in the polymer in at least 2% by weight. The prepolymer may be an α-ω,-dihydroxy terminated polylactide, polyε-caprolactone or polyglycolide polymer, and may include an internal polyethylene glycol group.

In one exemplary embodiment, the pre-polymer has an average molecular weight greater than 5 Kdaltons and less than 7.5 Kdaltons, and the polymer has an average total number of anhydride linkages between 8 and 12.

The polymer may be joined at one of its ends to a branched alcohol, forming a branched polyanhydride polymer.

In another aspect, the invention includes a method of producing a biodegradable, polyanhydride polymer having a selected Young's modulus between 1.5-3 GPa. In practicing the method, a polylactide, polycaprolactone or polyglycolide α-ω,-dihydroxy polymer whose polymer chains having an average polymer-chain molecular weight greater than 5 Kdaltons and less than 10 Kdaltons is selected, where lower Young's modulus values are attained by selecting an average polymer-chain molecular weight greater than 5 Kdaltons and less than about 7.5 Kdaltons. The α-ω,-dihydroxy polymer is converted to α-ω,-dianhydride chains, and polymerized under time and temperature conditions effective to produce a polylactide-based polyanhydride polymer having a selected average number of anhydride linkages in the range between 5 and 30, where lower Young's modulus values are attained with a lower average total number of anhydride linkages.

The α-ω,-dihydroxy polymer chains selected in may be polylactide, polyε-caprolactone, or polyglycolide chains having an average molecular weight greater than 5 and less than about 7.5 Kdaltons, and the total number of anhydride linkages produced in the polymerization step are between 8-12.

For use in producing a biodegradable, polyanhydride polymer having a rate of surface degradation that is effective to fully erode a bar of the polymer having dimensions of 50 microns×50 microns×2 mm, when incubated in phosphate buffered saline at 37° C., within a selected period of 5-180 days, wherein the α-ω,-dianhydride chains are polymerized in step (iii) under conditions effective to produce a selected rate of surface degradation, where a higher rate of surface degradation is achieved with a greater average total number of anhydride linkages.

The step of converting the α-ω,-dihydroxy polymer to α-ω,-dianhydride chains may include reacting the α-ω,-dihydroxy chains with succinic or glutaric anhydride under conditions effective to convert the α-ω,-dihydroxy chains to α-ω,-dicarboxylic acid chains, removing unreacted anhydride, and reacting the α-ω,-dicarboxylic acid chains with acetic anhydride under conditions effective to achieve the selected average number of anhydride linkages in the anhydride polymer.

The polymerization step may be carried out in the presence of a dicarboxy phenoxy alkyl dianhydride compound of the form:

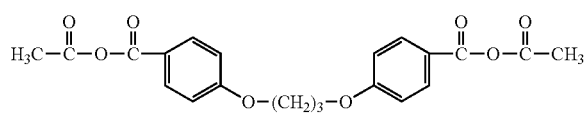

where the polyanhydride polymer formed has the structure:

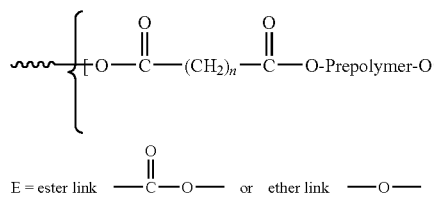

where E is a para ester linkage or an ortho or para ether linkage, the pre-polymer is an α-ω,-dihydroxy terminated polyester or polyether polymer having a molecular weight in a selected range between 1 to 10 Kdaltons;

x=80% to 98% by weight, y=20% to 2% by weight, n=2 to 4, m=2 to 10; and the average total number of anhydride linkages is a selected number in the range between 5-30, preferably 5-25.

In still another aspect, there is disclosed a biodegradable polyester-based polyanhydride polymer having, as a repeating polymer unit, a polylactide, polycaprolactone or polyglycolide α-ω,-dianhydride chain having an average molecular weight greater than 5 and less than 10 Kdaltons, and between 8-12 anhydride linkages. The polymer is characterized by: (i) a Young's modulus between 1.5-3 GPa, and (ii) a rate of surface degradation that is effective to fully erode a bar of the polymer having dimensions of 50 microns×50 microns×2 mm, when incubated in phosphate buffered saline at 37° C., within a selected period of 5-365 days. Rates of full erosion may be, for example, 5-30 days, 5-90 days, 5-180 days and 50-365 days.

The polymer may be used, for example, as the core or base of an expandable, intravascular stent, and/or may be used as a polymeric carrier of a drug-eluting coating in an expandable stent.

In a related embodiment, the invention includes an expandable, biodegradable stent comprising a biodegradable, polyanhydride polymer having, as a repeating polymer unit, the dianhydride of a polylactide, polycaprolactone or polyglycolide α-ω,-dihydroxy polymer having an average molecular weight greater than 5 and less than 10 Kdaltons, a selected Young's modulus between 1.5 and 3, and a selected average number of anhydride linkages in the range between 5 and 25.

In one embodiment, the polyanhydride polymer forms a biodegradable stent core, and the core is coated, on its exterior surface(s), with a polymer coating composed of a second biodegradable polyanhydride having a Young's modulus greater than 3, and a drug embedded therein.

These and other objects and features of the present invention will become more fully apparent when the following detailed description is read in conjunction with the accompanying drawings.

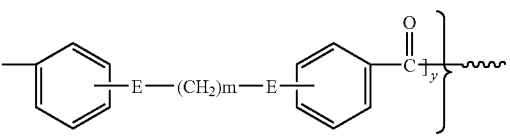

Figure 3:
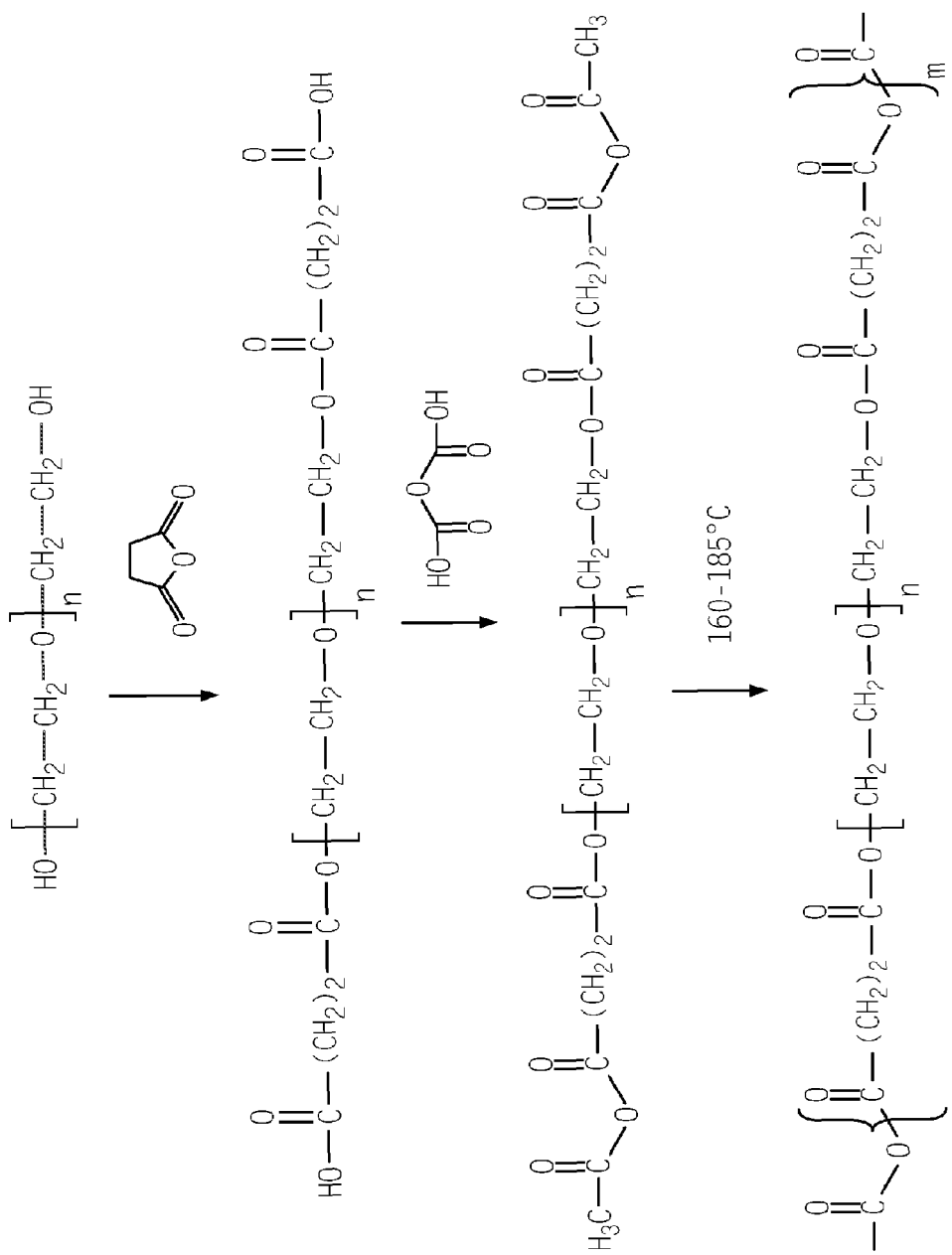
Figure 4:
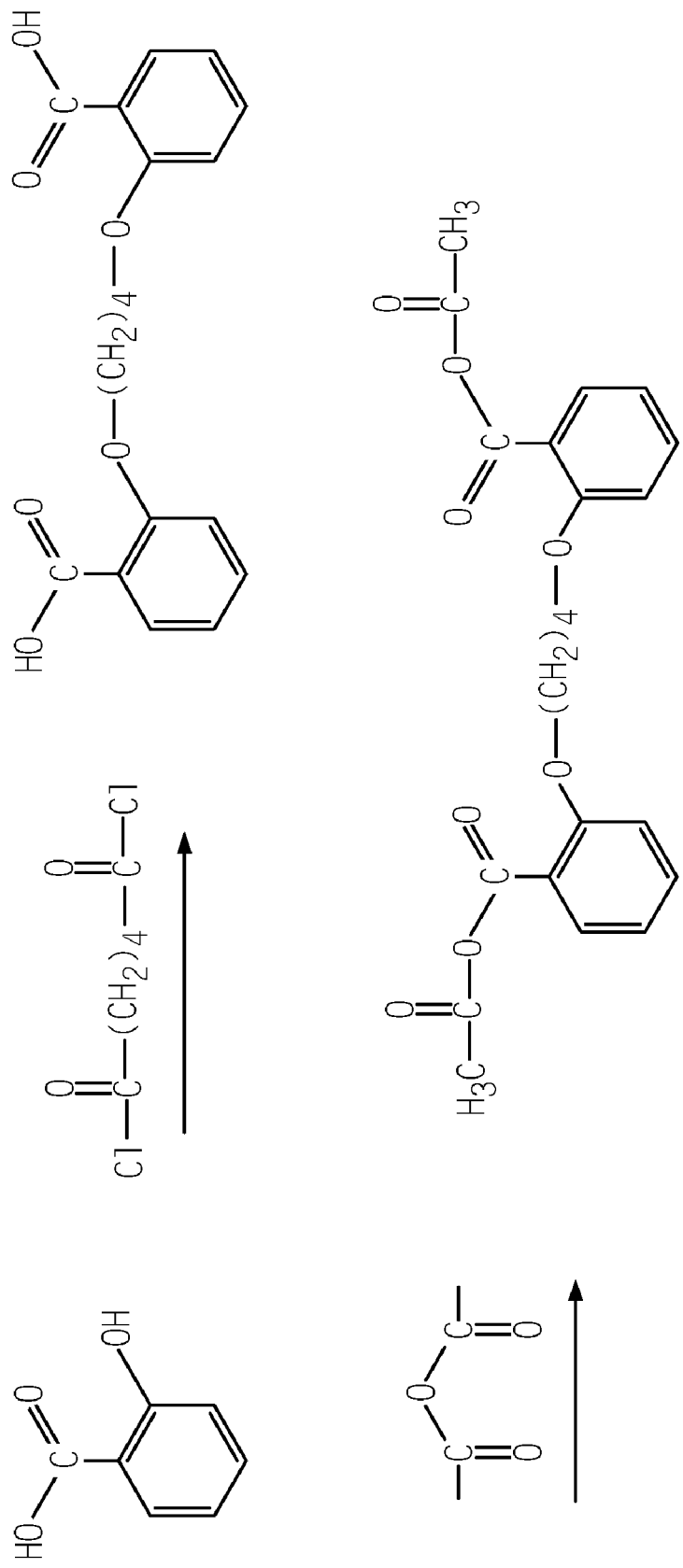
Figure 5:
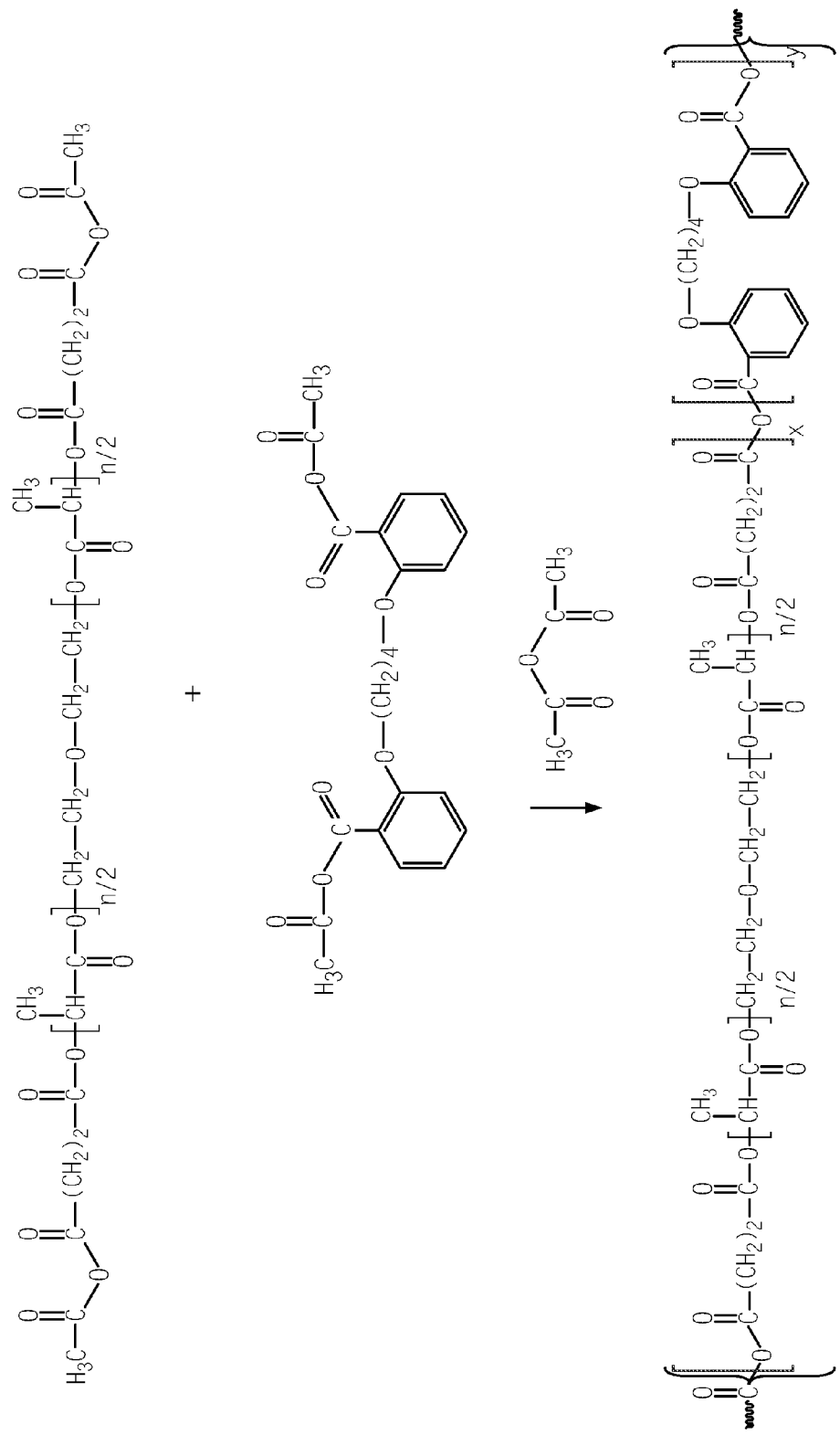
Figure 6A:
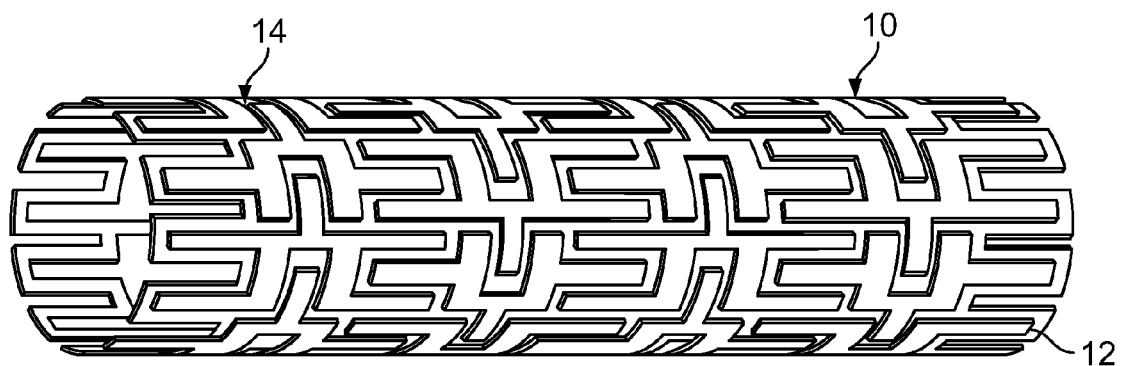
Figure 6B:
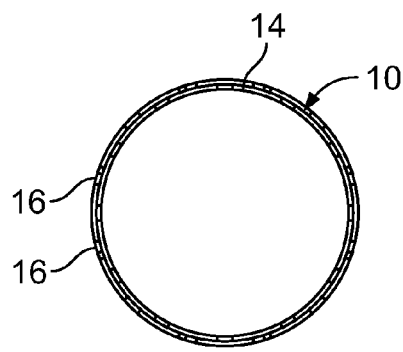
Figure 7:
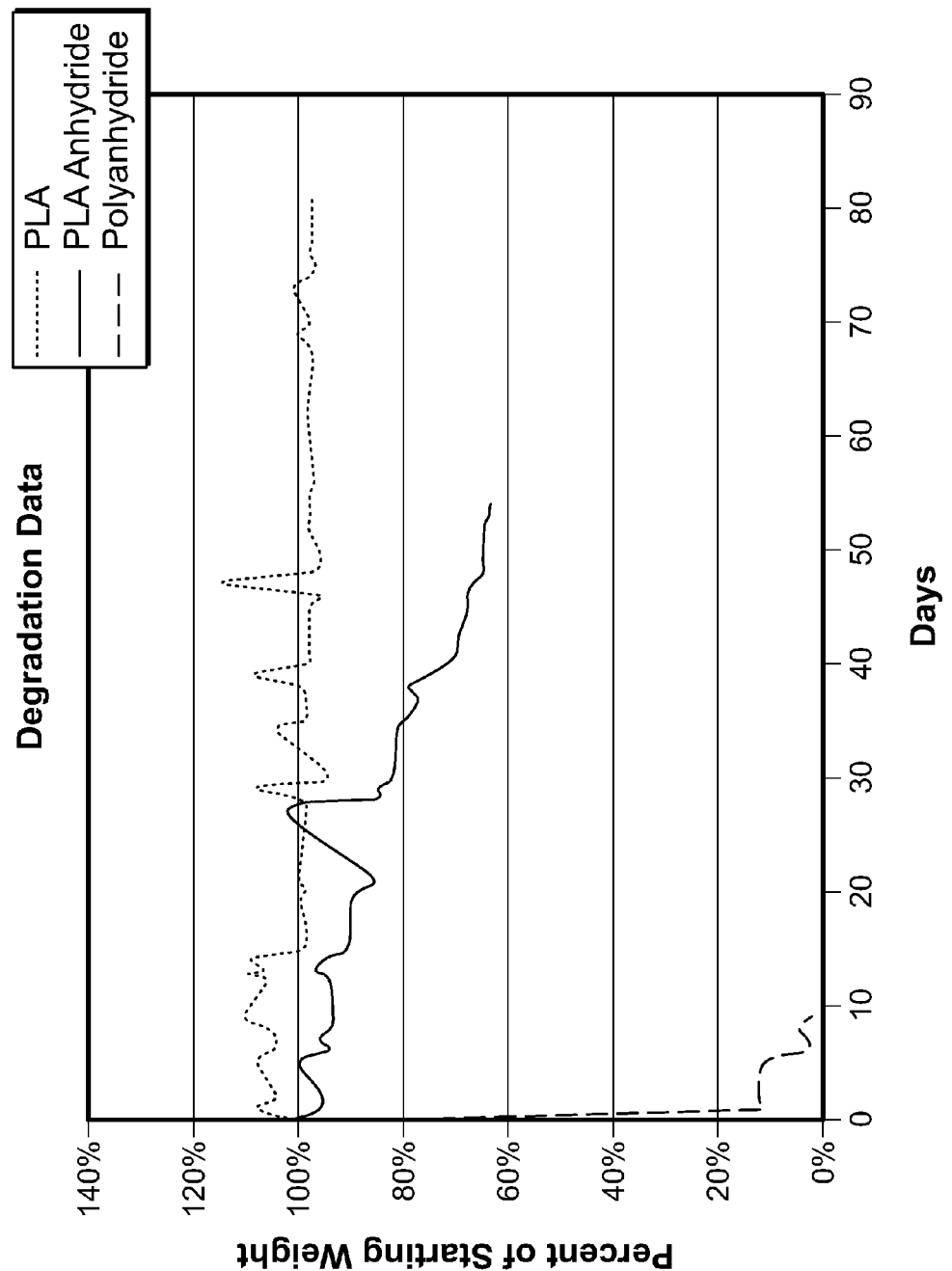

FIG. 3 illustrates steps in the synthesis of a polyethyleneglycol-based polyanhydride;

FIG. 4 illustrates steps in the synthesis of a 1,3-bis(p-carboxyphenoxy)propane subunit;

FIG. 5 illustrates steps in the synthesis of a polyanhydride copolymer of polylactide and the 1,3-bis(p-carboxyphenoxy) propane subunit of FIG. 4; and FIGS. 6A and 6B illustrate in perspective (6A) and cross-section (6B) a stent constructed in accordance with the invention;

FIG. 7 is a plot showing the rates of degradation of (i) a PLA polymer, (ii) a PLA polyanhydride polymer constructed in accordance with the invention; and (iii) a conventional polyanhydride polymer.

DETAILED DESCRIPTION OF THE INVENTION

I. Definitions

Unless indicated otherwise, the terms below have the following definitions:

A "polyanhydride polymer" is a polymer having at least some anhydride linkages between subunits of the polymer chain. More particularly, a polyanhydride polymer as defined herein, includes polyester or polyether subunits or blocks joined by anhydride linkages, and this polymer is also identified herein as a mixed polyester/polyanhydride or polyether/polyanhydride polymer. This polyanhydride polymer may also contain other polymer subunits or blocks, forming block copolymers whose blocks are linked by anhydride linkages. The composition of such polyanhydride co-polymers may be expressed in terms of relative weight percent of the two polymer blocks making up the block co-polymer.

A "prepolymer" refers to a polyester or polyether polymer chain which, when converted to a suitable α-ω,-dicarboxylic acid terminated polymer, forms the polymer subunits of one of the polymer subunits in a polyanhydride polymer. The dicarboxylic acid form of the prepolymer may also be referred to as a prepolymer.

A polymer subunit or block refers to a chain of two or subunits of the same polymer, such as a polyester subunit or a diphenoxy subunit, where the polymer subunit can itself contain additional components, such as a polyethylene glycol core joining polyester moieties.

The "average number of anhydride linkages" in an anhydride polymer is the average total number of anhydride linkages present connected the one or more polymer subunits in the polyanhydride chains, and may be determined, for example, by determining the average molecular weight of the anhydride polymer, knowing the relative amounts and sizes of the individual polymer blocks making up the polyanhydride polymer.

The "average molecular weight of polymer chains" in a polymer composition is the average molecular weight of the chains determined with respect to polylactide standard (from Polymer source Inc.) by size exclusion chromatography, according to standards methods (Ref: A. Kowalski, et. al., Macromolecules 1998, 31, 2114). Average molecular weight of the poly lactide anhydrides also be measured by other means, including laser-desorption ionization time-of-flight mass spectrometry, as described Zhu, H. et al, Journal of the American Society for Mass Spectrometry, Volume 9, Number 4, April 1998, pp. 275-281(7). Viscosity average molecular weight of the polylacdide anhydride can be determined by solution viscosity measured in chroloform at 35 C using Ubbelohde viscometer size 4 (obtained from Cannon Instrument Co. USA).

Intrinsic viscosity is defined as the viscosity of polymer solution in unlimited dilute concentration. It is independent on the concentration by virtue of extrapolation to zero concentration. In practice, when the polymer solution is enough dilute to separate the chain each other by solvent, the relative viscosity ($\eta r$) and specific viscosity ($\eta sp$) will follow the equations:

$$\eta sp/c = [\eta] + k'[\eta]^2 c$$

$$\ln \eta r/c = [\eta] + k''[\eta]^2 c$$

where:

$\eta r = \eta$ solution/$\eta$ solvent $\eta sp = (\eta$ solution/$\eta$ solvent$) - 1$ Within the dilute concentration range, intrinsic viscosity can be obtained by plotting $\eta sp/c$ vs. c and $\ln \eta r/c$ vs c to extrapolate the line to c=0.

The relationship between intrinsic viscosity and molecular weight can be found in Mark-Houwink equation:

$$[\eta] = \kappa M^\alpha$$

where $\kappa$ and $\alpha$ are parameters related to type of polymer, solvent and temperature. The molecular weight can be calculated from intrinsic viscosity if the parameters are known. In the present case, for example, the poly (D/L-lactide) based polyanhydride can be considered as pure poly(D/L-lactide) with several anhydride linkages instead of ester linkages. The parameters of poly(D/L-lactide) can be used to estimate the molecular weight of polyanhydride. The estimate anhydride linkage per chain of the polymer can be estimated from the molecular weight of the polyanhydride divided by the molecular weight of the pre polymer. The average number of anhydride linkage can also be determined from Light Scattering detectors attached on line with size exclusion chromatography. The size of macromolecule is large enough to emitting the light scattering, which can be used to calculate the molecular weight. Combining size exclusion chromatography (SEC) and light scattering on-line detector gives a rapid, efficient way to determine molecular weight and molecular weight distribution. Unlike pure polylactide, polylactide anhydride cannot be eluted properly through the column packing materials. This might be due to strong adsorption of the polyanhydride chains with the packing material of our columns.

In the determination of the molecular weights of the polyanhydride, the SEC columns are disconnected and a known concentration of polyanhydride is directly injected to the Viscotek T60A dual detector (Visco-LS) and the Varian 9040 RI detector with a guard column between the sample injector and the detectors. Chloroform (dried on CaH2) or THF (dried over benzophenone/Na complex) is used as the eluent at a flow rate of 1 ml/min. dn/do of the polymer was calculated in CHCl3 and in THF. Molecular weight, intrinsic viscosity and radius of gyration were than analyzed by the Viscotek TriSEC software.

"Young's modulus" or "Young's modulus of elasticty" is a measure of the stiffness of a given material. It is defined as the limit for small strains of the rate of change of stress with strain. This can be experimentally determined from the slope of a stress-strain curve created during tensile tests conducted on a sample of the material, and is usually expressed in GPa, i.e., $10^{12}$ N/m². Relatively stiff polymers, such as conventional polyanhydrides, polystyrene, and polyimides, have Young's modulus values in the range 3-5. Soft or highly flexible polymer, such as polyethylene, or rubber, can have Young's modulus values below 1. Young's modulus measurements can be made, for example, as described in L. A. Carlsson et al., Experimental Characterization of Advanced Composite Materials, Chapter 3 and 4, and ASTM Standard #E 111-4 method, as detailed, for example, in the ACTIVE STANDARD: E111-04 Standard Test Method for Young's Modulus, Tangent Modulus, and Chord Modulus, available form ASTM international (http://www.astm.org/cgi-bin/ SoftCart.exe/DATABASE.CART/REDLINE_PAGES/E111. htm?E+mystore)

II. Synthesis of Polyester/polyanhydride Polymers

The synthesis of the polymers of the invention generally proceeds in three steps. First, one of more prepolymer blocks or block subunits are provided, e.g., by synthesis. As will be seen further below, one of the prepolymers, and typically the dominant polymer subunit in the polyanhydride polymer, is preferably a polyester prepolymer having a molecular weight in the range 1-10 Kdaltons. Where the invention is practiced to produce a polyanhydride polymer having a desired Young's modular of elasticity in the range 1.5-3, the prepolymer has a molecular weight greater than 5 Kdaltons and preferably less than about 10 Kdaltons, preferably about 6-7 Kdaltons.

Figure 1:
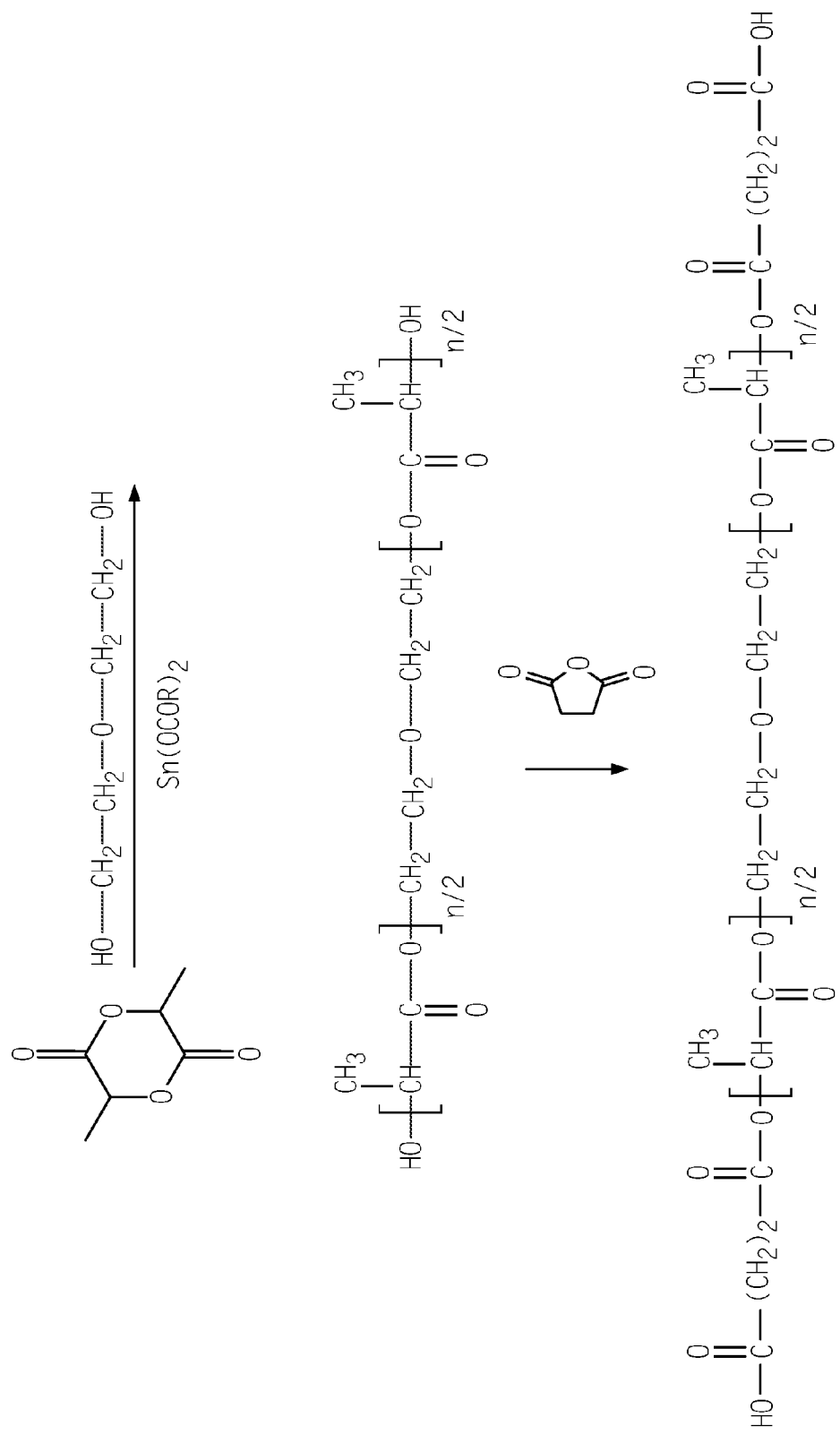
FIG. 1 illustrates steps in the synthesis of an α-ω,-dihydroxy polylactide prepolymer having a diethylene glycol core, and the conversion of the dihydroxy prepolymer to a dicarboxylic acid prepolymer.
Figure 2:
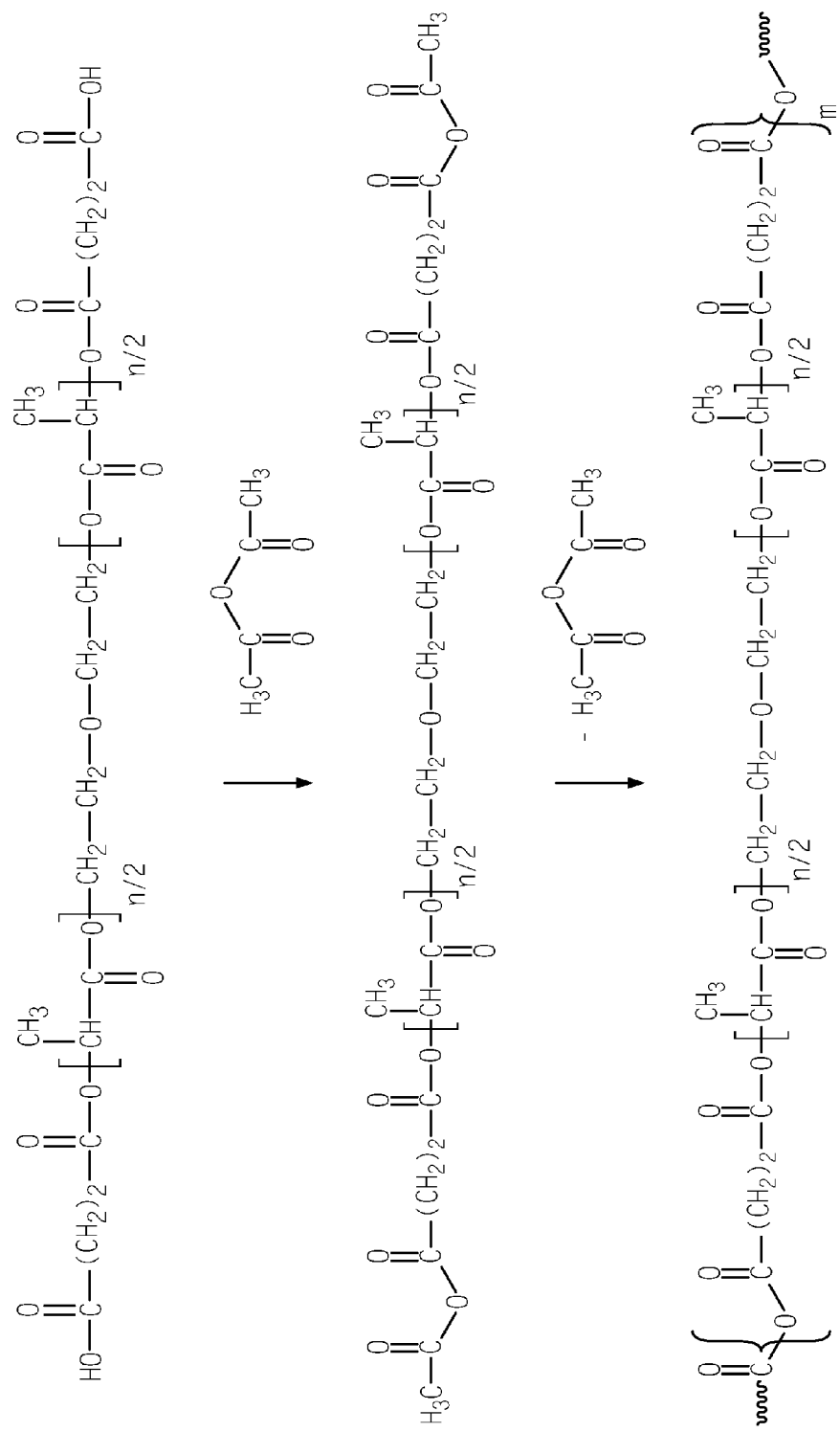
FIG. 2 illustrates steps in the conversion of the dicarboxylic acid prepolymer of FIG. 1 to an α-ω,-dianhydride polylactide prepolymer, and its polymerization to yield a polyanhydride polymer.

The polyester prepolymer may include a non-polyester core, for example, a dihydric alcohol core, such as a diethylene glycol core, as seen below in Examples 1 and 2 with respect to FIGS. 1 and 2. Preferred polyester polymers are biocompatible, bioerodable polyester polymers, such as polydactyl acid (PLA, or polylactide), polyglycolic acid (PGA), and polye-caprolactone, each preferably containing a dihydric alcohol core. Methods for synthesizing such polyester or polyether or mixed polyether/polyester polymers are well-known in the art, and one exemplary method is described in Example 1 below with reference to FIG. 1.

In addition to a polyester (and/or polyether) prepolymer component(s), the polyanhydride polymer of the invention may contain other block components, such as diphenoxy subunits, such as the 1,3 bis carboxy phenoxy propane subunit whose synthesis is described in Example 4 with respect to FIG. 4. In an anhydride polymer whose subunits include both polyester and at least one other block, e.g., a diphenoxy subunit, the polyester is preferably present in an amount 80%-98 percent by weight of the final polymer, with the other component(s) being present in an amount 2-20% by weight of the final polymer.

In the second step in forming the polyanhydride of the invention, the prepolymer component(s) from above are converted to terminal-group dicarboxylic acids, e.g., from α-ω,-dihydroxy terminated polyester prepolymers, to corresponding α-ω,-dicarboxylic acid terminated prepolymers. This conversion is typically carried out by reaction of the prepolymer with succinic anhydride. More generally, reaction of reaction of α-ω,-dihydroxy terminated polyester (or polyether) polymers with cyclic anhydride produce α-ω,-dicarboxylic acid terminated polyester (or polyether) prepolymers, according to known methods. Methods for converting polyester or polyether or mixed polyether/polyester polymers to corresponding dicarboxylic acids are well-known in the art. Exemplary methods are described in Example 2 below with respect to reference to FIG. 2.

In the final polymerization step, prepolymer components of the polymer are polymerized under conditions effective to link the prepolymer components by anhydride linkages. This is done, in one exemplary method, by first reacting the dicarboxylic acid prepolymer or block components with acetic anhydride, to convert the terminal acid groups to corresponding anhydrides. The prepolymer dianhydrides are then dried to remove unreacted acetic anhydride. In the final polymerization step, the dianhydride block or prepolymer components are mixed in a desired weight proportion, as noted above, and reacted under conditions effective to produce a polyanhydride polymer having a selected number of polyanhydride linkages, e.g., 3-30 anhydride linkages.

One exemplary polymerization method that is the one method described in Example 2 below with reference to FIG. 2. Briefly, in this method, the dianhydride component(s) are added to a metal oxide, such as calcium oxide, and heated under an inert atmosphere until melting, with continued heating under vacuum to remove excess acetic anhydride, with additional heating, e.g., at a temperature between 180° C. to 220° C., until a desired degree of polymerization has occurred. The degree of polymerization, that is, the number of anhydride linkages in the final polymer can be determined readily from intrinsic viscosity of the polymer and by light scattering measurement from Viscotek detectors, as described above, to determine polyanhydride molecular weight, then dividing by the known molecular weight of the pre polymer. As will be seen below, the desired extent of polymerization will be dictated by elasticity properties and rates of degradation that are desired. For example, in accordance with one embodiment of the invention, it has been discovered that greatest polyanhydride elasticity (lowest Young's modulus) can be achieved in a polyester prepolymer having an average molecular weight of about 6 Kdaltons, and between 8-12 anhydride linkages. Above, 8-12 linkages, the polymer will show a greater rate of surface degradation, and also a greater Young's modulus. Thus, in accordance with this embodiment of the invention, biocompatible, biodegradable polymers having a desired elasticity and surface degradation rate can be achieved by certain reaction variables that are readily selected, including:

1. The molecular weight of the polyester (or polyether) prepolymer. As noted above, and seen from the data in Section III below, greatest polymer flexibility (lowest Young's modulus) can be achieved at a polyester prepolymer molecular weight of greater than 5 Kdaltons and less than about 7-10K daltons;

2. The extent of polymerization as measured by the average number of anhydride linkages in the final polymer, which will effect both elasticity and rate of surface degradation;

3. The presence of block components other polyester prepolymers. For example, including the polyanhydride includes the 1,3,-bis carboxyphenoxypropane component described in Example 4 has the effect of improving the bioerosion characteristics of the polymer, for example, to favor bioerosion over bulk erosion.

III. Applications

A. Polymer Characteristics

As noted above, the present invention provides a method for producing a biodegradable, polyanhydride polymer having a selected Young's modulus between 1.5-3 GPa, and optionally, a polymer having both a selected Young's modulus and selected rate of surface degradation.

Young's modulus of the polyanhydridepolymer may be determined by standard methods, such as by the ASTM Standard #E111-4 method, as described above. Young's modulus measurements carried out on various polyanhydrides of the invention showed increasing elasticity (lower Young's modulus values) with greater polyester lengths (a polyester prepolymer with a diethyleneglycol core) with increasing prepolymer molecular weight in the molecular weight range 1-6 Kdaltons, and decreasing elasticity as the prepolymer molecular weight was increased beyond about 6-7.5 Kdaltons, at a fixed number of about 10 anhydride linkages. In general, the method of the invention will be effective in achieving Young's modulus values in the range 1.5-3, as opposed to the higher values (e.g., greater than 3 and up to 5, seen with conventional anhydride polymers.

The second variable in the polymer method is number of anhydride linkages, which will affect both elasticity and rate of polymer degradation. In carrying out the method of the invention, once an optimal prepolymer length is identified, for purposes of obtaining desired elasticity properties in the polymer, the polymerization conditions can be varied to achieve a selected number of anhydride linkages, typically selected to strike a balance between achieving desired elasticity properties and surface degradation properties. The selected average number of anhydride linkages is preferably between 5-30, where polyanhydride polymers having a greater number of such linkages showing more rapid surface degradation rates.

To illustrate, at a polyester prepolymer molecular weight of between 6-7.5 Kdaltons, optimal flexibility is achieved under polymerization conditions that yield an average of about 8-12, and more specifically, about 10 anhydride linkages. However, if a greater surface degradation rate is desired, polymerization conditions yielding a greater number of anhydride linkages, e.g., up to 30, would be employed. As can be seen from Example 2, increasing numbers of anhydride linkages is achieved by carrying out the polymerization reaction for longer periods, e.g., up to 6-12 hours, and optionally, at somewhat higher temperatures, e.g., 170° C. preferably at 180° C.

The degradation properties of the novel polyanhydrides of the invention can be seen from the degradation plots shown in FIG. 7. The graph compares the rate of degradation of a conventional PLA polymer, a conventional polyanhydride, and a polyanhydride of the invention having a prepolymer molecular weight of between 6-7.5 Kdaltons, and an average of about (8-12 anhydride linkages. Degradation rates were measured using a polymer bar having bar dimensions of 50 microns×50 microns×2 mm, incubated in phosphate-buffered saline (PBS) at 37° C. for periods of up to 100 days. At periodic test intervals, the bar was weighed to determine loss of material, and also inspected microscopically to determine whether degradation was largely occurring at the surface, as evidenced by a relatively smooth-surfaced bar, or by bulk degradation, as evidenced by the presence of pits or cavities within the bar.

As seen from FIG. 7, PLA polymer showed little degradation after 80 days. With longer degradation times, the PLA bar showed signs of bulk degradation. The polyanhydride polymer, by contrast, was about 90% degraded after one day and completely degraded within 10 days. At all times, the bar had a smooth surface indicative of surface degradation. The polyester-based polyanhydride showed a relatively linear degradation rate that was intermediate between the other two polymers, losing about 40% of its weight after about 50 days. Extrapolating these times points, complete degradation would occur over a period of about 150 days. Further, inspection of the degrading polymer showed that degradation was occurring by surface, rather than bulk loss.

B. Biodegradable Stents

The polyester- or polyether-based polyanhydrides of the invention have a number of biomedical applications that take advantage of the improved elasticity and/or degradation properties of the polymers. For example, the block-copolymers described with respect to FIG. 5 may be advantageous for drug-delivery applications because of improved bioerodability. In this application, the block co-polymers would be formed in the presence of a selected drug, at a drug/polymer ratio in the range 1:50 to 1:1, and formed into desired drug-delivery devices of particles, e.g., injectable particles having sizes in the 0.5 to 50 micron size range.

An important application of the high-flexibility polyanhydride described above is in a biocompatible, biodegradable intravascular stent. Currently stents for use at intravascular sites of injury are deployed by radial expansion over a balloon catheter, and thus require the ability to expand significantly and to hold their expanded shape when deployed, properties that led to the widespread use of metals, such as stainless steel, in stent construction. The present invention provides an expandable, shape-retaining bioerodable stent material, allowing the advantages of physical stenting, but in a device that will ultimately biodegrade by surface erosion over a selected stenting period.

FIG. 6A shows a stent 10 constructed in accordance with a conventional stent architecture, but formed from a biocompatible, biodegradable polyanhydride material in accordance with the invention. As seen best in FIG. 6B, the stent includes a core 14 formed of a lattice of interconnected struts, such as struts 16, according to known stent architecture. This core, which is formed of an expandable, controlled-degradation polyanhydride of the invention, may be made conventionally, e.g., by forming the polymer into a cylindrical sleeve, and laser cutting the struts. Typically, the polyanhydride forming the core will have a degradation rate for complete bioerosion over a 180-360 day period.

The stent's core may be coated with a biodegradable drug-eluting coating, designed to release an anti-restensosis drug, such as taxol or rapamycin, embedded in the coating, over a selected time period. Typically, drug-elution is designed to occur over a relatively short period, e.g., 3 days to two weeks post implantation, and therefore the coating can be formed advantageously from a conventional polyanhydride with rapid surface erosion characteristics. Such a drug-containing polymer may be prepared by known methods, and applied to the stent core by conventional means, such as by dipping or spraying. The coating has a typical thickness between 3-50 microns and thus can be expanded, along with the stent core, even though the coating has a Young's modulus in the range greater than 3 GPa.

This aspect of the invention thus includes an expandable, biodegradable stent comprising a biodegradable, polyanhydride polymer having, as a repeating polymer unit, the dianhydride of a polylactide, polycaprolactone or polyglycolide $\alpha$-$\omega$,-dihydroxy polymer having an average molecular weight greater than 5 and less than 10 Kdaltons, a selected Young's modulus between 1.5 and 3, and a selected average number of anhydride linkages in the range between 5 and 25. In the embodiment just described, the polyanhydride polymer forms a biodegradable stent core which is coated, on its exterior surface(s), with a polymer coating composed of a second biodegradable polyanhydride having a Young's modulus greater than 3, and a drug embedded therein.

The following examples will illustrate various methods for synthesizing and characterizing polyanhydride polymers, in accordance with the present invention, but are in no way intended to limit the scope of the invention.

EXAMPLE 1

Synthesis of $\alpha$-$\omega$,-di-carboxylic acid poly lactide Prepolymer

Prepolymer of D/L-lactide

The steps in this example are described with reference to FIG. 1. Diethylene glycol distilled over $CaH_2$ before use.

D/L-lactide was sublimed under vacuum. All the solvents were purified by distillation over proper dehydrating reagent to remove the moisture. Under argon protection, to a 1000 ml flask add 0.0238 mole of diethylene glycol, D/L-lactide (120 g) were charge. The mixture was heated to 135° C. Once the lactide monomer was melted down than catalyst of Tin(II) 2-ethylhexanoate (100 mg-1 ml of toluene) was added by glass syringe. The mixture was heated to 135° C. for 25 minutes. In 25 minutes the monomer conversion reaches to about 90% an equilibration of polymerization with the unreacted monomer. The reaction was stopped by cooling down the reaction flask in cold water. The solidified polymer was dissolved in acetone and the polymer was precipitated in ethanol/hexane 2:8 v/v mixture. This procedure of precipitation was repeated three times to remove the unreacted lactide monomer.

The presence of lactide monomer in the form polymer was checked by FTIR by the disappearance of a characteristic absorbance at 1250 cm$^{-1}$ from the cylic structure of the monomer. The yield of the polymer was 109 g. The SEC and NMR analysis show that the polymer has the required molecular weight (Mn 6500, Mw/Mn 1.08) as expected and bears two-hydroxyl termini on the chain ends. After drying the hydroxyl terminated poly(D/L-lactide) under vacuum and azeotrope distillation over toluene (to ensure the moisture free prepolymer), 8 g of succinic anhydride (sublimed under vacuum) was mixed with polymer and the mixture was heated to 130° C. for 8 hours.

The polymer was dissolved in dichloromethane when it is cold. 500 ml of water was introduced and the solution was stirred for 1 hour. The water was separated by a separatory-globes shape funnel. The washing of the polymer solution was carried out three times to remove the unreacted succinic anhydride (the disappearance of the anhydride peak (1820 cm$^{-1}$) on the FTIR spectrum). The polymer was recovered from precipitation into cold diethyl ether. The yield of the polymer was 105 g.

EXAMPLE 2

Synthesis of α-ω,-di-anhydride poly lactide prepolymer and its polymerization to yield polyanhydride based on poly lactide The steps in this example are described with reference to FIG. 2. α-ω,-dicarboxylic acid poly lactide (D/L-lactide) from example 1 (105 g) was heated with 600 ml acetic anhydride (chemical purity+99%) to 100° C. for 8 hours, then the mixture was applied vacuum to remove the excess of acetic anhydride. Once all the unreacted acetic anhydride was removed under vacuum, the obtained polymer was added 10 mg of calcium oxide, under Argon protection, the mixture was cooked at 165° C. until melting. The temperature was increased to 180° C. for 4 hours with vacuum removal of acetic anhydride. Finally, the temperature will reach to 180° C. for 8 hours to extend the molecular weight to a maximum. The resulting polyanhydride is pure enough for our applications. The molecular weight was estimated from viscosity about 40,000 to 80,000. The polymer has the molecular weight higher enough to draw the flexible fibers.

Additional anhydrides were similarly prepared using (i) the α-ω,-di carboxylic acid of a poly lactide pre-polymer having molecular weight 500; (ii) the α-ω,-dicarboxylic acid of a poly lactide prepolymer having molecular weight of 1000.

EXAMPLE 3

Synthesis of a poly(ethylene glycol) based polyanhydride

The steps in this example are described with reference to FIG. 3. Poly(ethylene glycol), Sample lot # P4790-EG2OH with Mn=3400, 120 g was dissolved in 300 ml dry toluene at 45° C. Azeotropic distillation of toluene was applied to remove the moisture in the sample. After almost all toluene removed, 14 g of succinic anhydride was added and the mixture was heated up to 120° C. under argon protection. The reaction completed after 4 hours at this temperature. The polymer was dissolved in dichloromethane when it is cold. 500 ml of water was introduced and the solution was stirred for 1 hour. The water was separated by a separatory-globes shape funnel. The washing of the polymer solution was carried out three times to remove the unreacted succinic anhydride (the disappearance of the anhydride peak (1820 cm$^{-1}$) on the FTIR spectrum). The polymer was recovered from precipitation into cold diethyl ether. The yield of the polymer was 110 g.

Dry α-ω,-dicarboxy terminated PEG was mixed with acetic anhydride (chemical purity+99%), and the solution was reflux for 8 hours. Then, the vacuum was applied to remove the excess of acetic anhydride. The highly viscous mass material was added with 50 mg of calcium oxide, under Argon protection, the mixture was cooked at 165° C. until melting. The temperature was increased to 180° C. for 4 hours with vacuum removal of acetic anhydride. Finally, the temperature will reach 195° C. for 8 hours to extend the molecular weight to maximum. The resulting polyanhydride is pure enough for our applications. The molecular weight was estimated from viscosity about 30,000 to 50,000.

EXAMPLE 4

Synthesis of a Polyanhydride Copolymer Containing Polylactide and b is 1,3-bis-carboxyphenoyxypropane Block Component The steps in this example are described with reference to FIGS. 4 and 5. A known quantity of dicarboxy phenoxy alkyl dianhydride compound was mixed with poly lactide dianhydride prepolymer by weight and the mixture was heated under argon in the presence of CaO as catalyst. The polymerization temperature was kept 150° C. for 2 h under continuous argon atmosphere to remove the liberated acetic anhydride side product. Finally the vacuum was applied to the mixture and the temperature increased to 180° C. for 2 h. and the temperature raised to 190° C. for 3 h. The polymerization was stopped by cooling down. The product was isolated in the form of light brown color chunk pieces.

Although the invention has been described with respect to certain methods and applications, it will be appreciated that a variety of changes and modification may be made without departing from the invention as claimed.

What is claimed is:

1. A biodegradable polyester-based polyanhydride polymer having, as a repeating polymer unit, a polylactide, polycaprolactone or polyglycolide α-ω,-dianhydride chain having an average molecular weight greater than 5 and less than 10 Kdaltons, and between 8-12 anhydride linkages, where each anhydride linkage links a pair of adjacent repeating polymer units, and said polymer is characterized by:

(i) a Young's modulus between 1.5-3 GPa, and (ii) a rate of surface degradation that is effective to fully erode a bar of the polymer having dimensions of 50 microns×50 microns×2 mm, when incubated in phosphate buffered saline at 37° C., within a selected period of 5-365 days.

2. The polymer of claim 1, wherein the rate of surface degradation is effective to fully erode a bar of the polymer having dimensions of 50 microns×50 microns×2 mm, when incubated in phosphate buffered saline at 37° C., within a selected period of 5-180 days.

3. The polymer of claim 2, formed as an expandable, biodegradable intravascular stent.

4. The polymer of claim 3, having a drug embedded within the polymer, for release therefrom, as the polymer is bioeroded.

5. An expandable, biodegradable stent comprising a biodegradable, polyanhydride polymer having, as a repeating polymer unit, the dianhydride of a polylactide, polycaprolactone or polyglycolide α-ω,-dihydroxy polymer having an average molecular weight greater than 5 and less than 10 Kdaltons, a selected Young's modulus between 1.5 and 3, and a selected average number of anhydride linkages in the range between 5 and 30, where each anhydride linkage links a pair of adjacent repeating polymer units.

6. The stent of claim 5, wherein the polyanhydride polymer forms a biodegradable stent core, and the core is coated, on its exterior surface(s), with a polymer coating composed of a second biodegradable polyanhydride having a Young's modulus greater than 3, and a drug embedded therein.

7. The polymer of claim 1, wherein the prepolymer chain includes an internal polyethylene glycol bordered by polylactide, polycaprolactone or polyglycolide polymers.

* * * * *